United States Patent
Buttolo et al.

(10) Patent No.: US 7,257,901 B1
(45) Date of Patent: Aug. 21, 2007

(54) SWITCH FEEL MEASUREMENT SETUP

(75) Inventors: Pietro Buttolo, Dearborn Heights, MI (US); James Rankin, II, Novi, MI (US); Yifan Chen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 138 days.

(21) Appl. No.: 11/382,372

(22) Filed: May 9, 2006

(51) Int. Cl.
*G01B 7/00* (2006.01)

(52) U.S. Cl. .................................. 33/1 N; 33/1 PT
(58) Field of Classification Search ............... 33/1 N, 33/1 PT, 706–708; 324/207.11; 73/514.16, 73/514.31, 514.39

See application file for complete search history.

(56) References Cited

U.S. PATENT DOCUMENTS

| 6,341,426 | B1 * | 1/2002 | Okumura | 33/1 PT |
| 6,880,254 | B2 * | 4/2005 | Uehira et al. | 33/1 PT |
| 6,987,384 | B2 * | 1/2006 | Uehira et al. | 324/207.25 |
| 7,089,672 | B2 * | 8/2006 | Noltemeyer | 33/1 PT |
| 2005/0115087 | A1 * | 6/2005 | Noltemeyer | 33/1 PT |

\* cited by examiner

*Primary Examiner*—Yaritza Guadalupe-McCall
(74) *Attorney, Agent, or Firm*—David B. Kelley; MacMillan, Sobanski & Todd

(57) ABSTRACT

A method may be employed to assure that a switch feel measurement system accurately measures a torque/angular displacement profile for a pivot switch. A procedure may be employed that aligns the pivot axis of the switch with the rotational axis of the measurement unit of the switch measurement system.

18 Claims, 5 Drawing Sheets

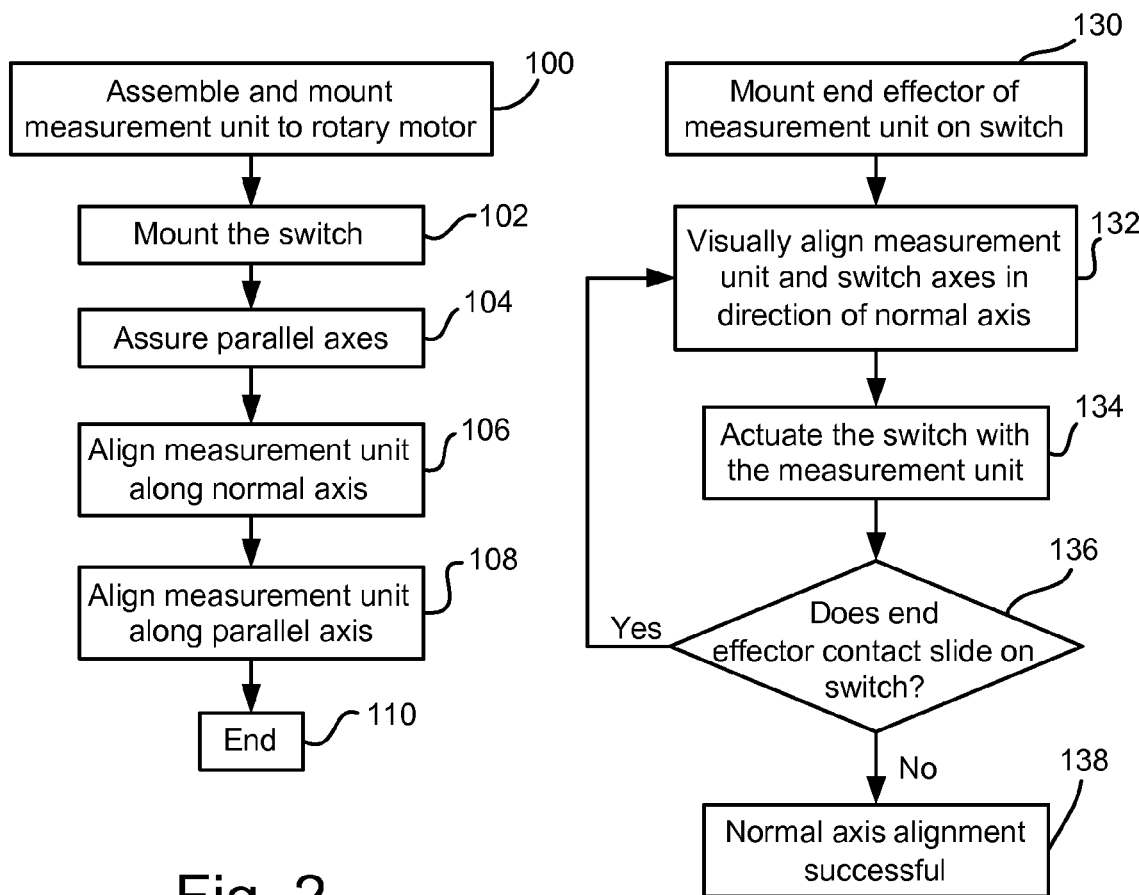
Fig. 2
Fig. 4
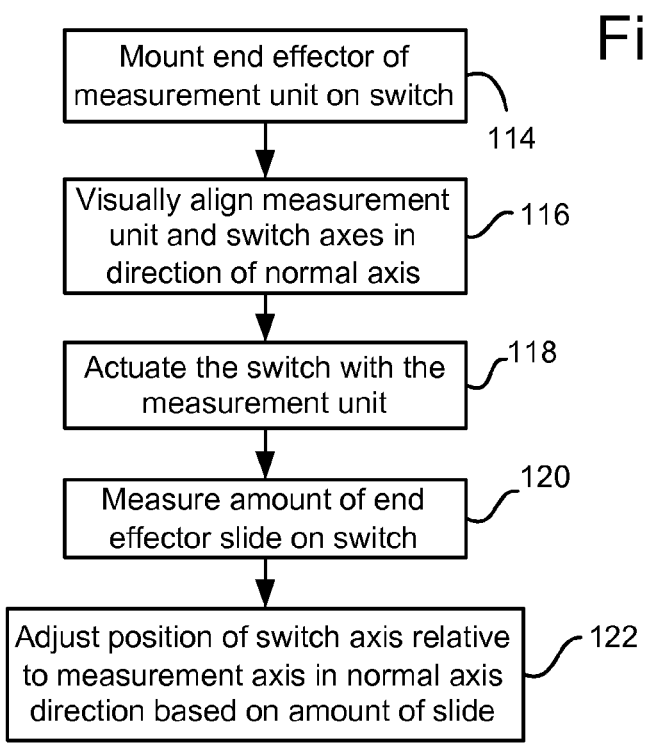
Fig. 3

SWITCH FEEL MEASUREMENT SETUP

BACKGROUND OF INVENTION

The present invention relates to measuring human/mechanism interfaces, and more particularly to such measuring systems that relate to the measurement of relatively small one degree of freedom mechanisms, such as switches.

As the market for sales of products becomes more competitive, a manufacturer must distinguish its products from the competition. Thus, a product design may require more than providing the proper function—it may also require providing a certain feel or image for the product. For example, a small mechanism, such as a switch, may need to not only perform its function of adjusting the operation of a product, but also provide a certain feel to the switch operator while being actuated. Such a switch feel may give an impression of quality or distinctiveness to the product, and one may wish to have this particular feel for all of the switches on a given product—that is, a switch feel harmony. Thus, the feel of a switch may be almost as important as the function the switch performs. In order to define and achieve this feel, the human/machine interface for that particular switch must be defined.

In addition, for many manufacturers, the switches are fabricated by multiple suppliers. In order to maintain switch feel harmony, then, one must be able to not only define the switch feel characteristics in a quantitative and objective manner, but also posses an ability to measure the switches produced by the suppliers, in an accurate and reliable way, in order to verify that the switches meet the criteria. Consequently, an accurate and repeatable way to define and measure switches is needed.

Conventionally, measurements for determining characteristics of switches were accomplished by mounting the switches in laboratory type fixtures and connecting them to a switch measurement device. Typically, these measurement devices measured the peak force that was applied during switch actuation and possibly also the range of motion. But peak force alone cannot completely define the human perception of feel. Two switches having the same peak force can feel quite differently. Consequently, the feel of such switches was determined by consensus in panel studies. These conventional approaches, however, do not produce a quantitative, objective, verifiable, and repeatable means for completely measuring the feel of a switch.

As a result, some of the more advanced systems employ a laboratory type fixture with a more advanced measurement device that can measure the force applied to the switch as the switch moves through its range of motion. This force/displacement profile, then, provides a more complete definition of the switch properties.

For switches that pivot, the switch measurement system must be able to properly grip and/or contact the switch while manipulating the switch about its pivot axis. In the past, however, measurement systems have used linear measurements for pivot switches, which inherently introduces error into the measurements since pivot switches move in an arc, not a straight line. Moreover, to precisely and repeatably measure the torque/angular displacement characteristics of pivot switches, an accurate alignment of the axis of the switch measurement unit with the pivot switch being measured is required. Merely a rough visual alignment will generally yield inconsistent and less accurate results than is desired for defining and verifying the switch feel characteristics of a pivot switch.

SUMMARY OF INVENTION

According to an embodiment, there is provided a method for minimizing errors associated with measuring torque/angular displacement profiles of a pivot switch, the method comprising the steps of: mounting the pivot switch with a switch axis parallel to a measurement axis for a measurement unit of a switch measuring system; detecting a switch normal axis direction offset between the switch axis and the measurement axis; aligning the switch axis with the measurement axis in the switch normal axis direction, if the switch axis is offset from the measurement axis in the switch normal axis direction; detecting a switch parallel axis direction offset between the switch axis and the measurement axis; and aligning the switch axis with the measurement axis in the switch parallel axis direction, if the switch axis is offset from the measurement axis in the switch axis parallel direction.

According to an embodiment, there is provided a method for aligning a switch axis of a pivot switch to be measured with a measurement axis of a measuring unit of a switch feel measuring system, the method comprising the steps of: mounting the pivot switch with the switch axis parallel to the measurement axis; visually aligning the switch axis and the measurement axis in a switch normal axis direction; moving the pivot switch through a range of motion with the measurement unit while determining if an end effector in contact with the pivot switch slides relative to a contact point on the pivot switch; and changing the alignment of the switch axis relative to the measurement axis in the switch normal axis direction if the end effector slides relative to the contact point while moving through the range of motion.

According to an embodiment, there is provided a method for aligning a switch axis of a pivot switch to be measured with a measurement axis of a measuring unit of a switch feel measuring system, the method comprising the steps of: (a) mounting the pivot switch with the switch axis parallel to the measurement axis; (b) aligning the switch axis and the measurement axis in a switch normal axis direction; (c) moving the pivot switch through a range of motion with the measurement unit and determining a first peak torque $\tau_{M1}$; (d) changing a contact point of an end effector of the measurement unit on the pivot switch; (e) moving the pivot switch through the range of motion with the measurement unit and determining a second peak torque $\tau_{M2}$, after step (d); (f) calculating an offset in a switch parallel axis direction based on the first peak torque $\tau_{M1}$, and the second peak torque $\tau_{M2}$; and (g) aligning the switch axis with the measurement axis in the switch parallel axis direction, if the switch axis is offset from the measurement axis in the switch axis parallel direction.

An advantage of an embodiment is that the analytical method for aligning and verifying the alignment for the switch measuring system relative to a pivot switch being tested provides accurate, repeatable and verifiable switch measurement profiles.

An advantage of an embodiment is that the alignment process, while being precise, is also relatively easy and quick to administer, and, if desired, can be automated.

BRIEF DESCRIPTION OF DRAWINGS

FIG. 2 is a flow chart of a switch measurement setup and testing process.

FIG. 3 is a flow chart illustrating details of a step for aligning axes in a direction of a switch normal axis.

FIG. 4 is a flow chart similar to FIG. 3, but in accordance with another embodiment.

FIGS. 8a and 8b are graphical illustrations of the geometry for a method of aligning the measurement unit and switch axes along the switch parallel axis, according to the flow chart of FIG. 5, with FIG. 8b shown on a larger scale than FIG. 8a.

DETAILED DESCRIPTION

Figure 1:
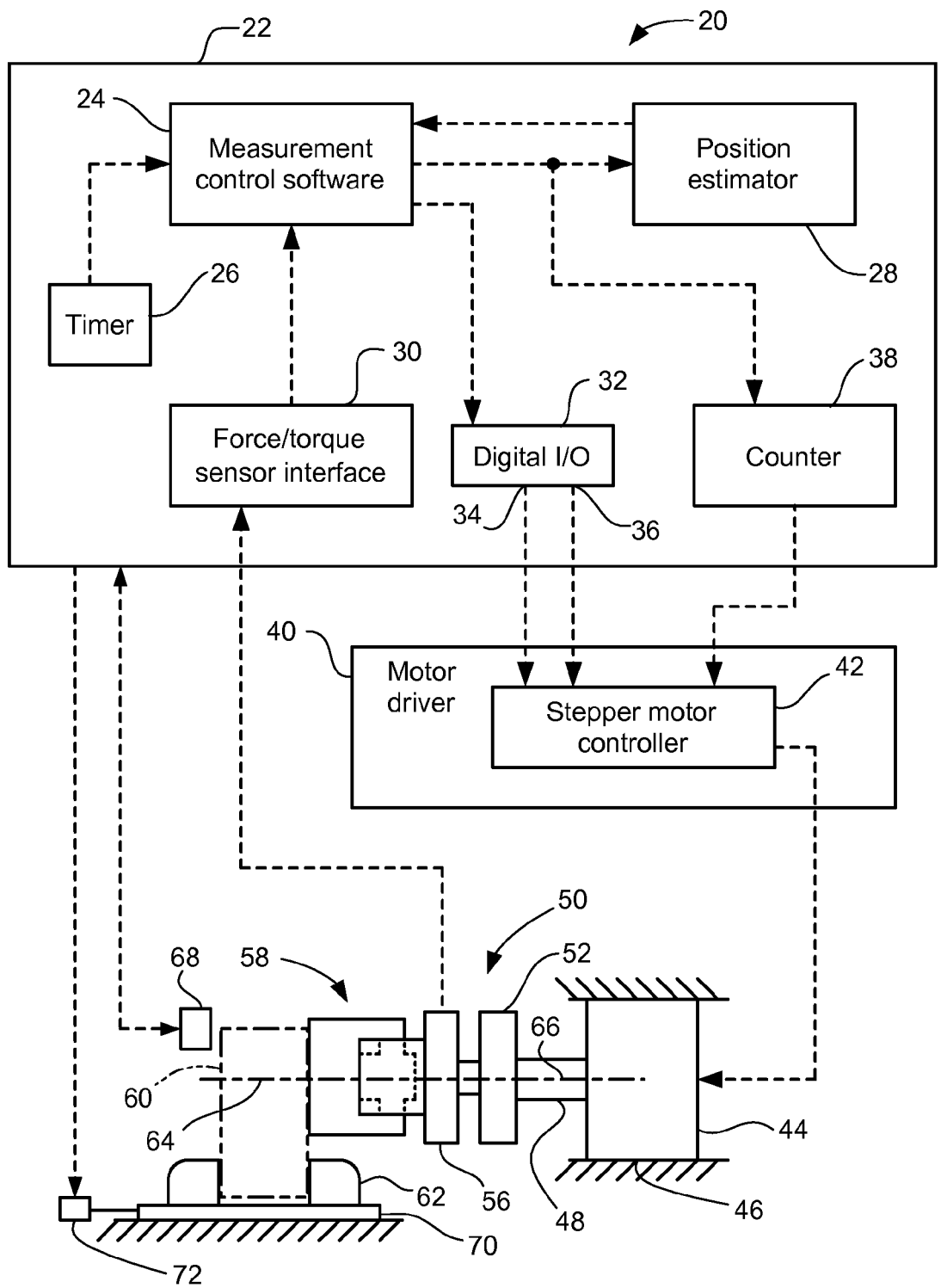
FIG. 1 is a schematic diagram of an overall switch measurement system.

FIG. 1 illustrates a portion of a switch feel measuring system 20, which is optimally employed for accurately measuring a torque/angular displacement profile for small one degree of freedom mechanisms, such as pivot switches. The switch feel measurement system 20 is, in effect, a type of physical impedance meter. That is, it can measure resistance to the motion of a mechanism as it travels along its predefined path, such as, for example, static friction, dynamic friction, inertia, weight, spring forces, and air pressure. These forces give the mechanism its feel characteristics as a human moves the mechanism along its path.

The switch measurement system 20 includes a control unit 22, such as, for example, a general purpose computer running a general purpose operating system, such as a MICROSOFT WINDOWS™ operating system, produced by Microsoft Corporation, of Redmond, Wash. The control unit can also be a special purpose computer, if so desired. The control unit 22 includes a graphical user interface to allow a user to see measured torque/angular displacement (or force/displacement) profiles. The dashed lines shown in FIG. 1 represent electrical (or other types of communication/power) connections between various system components.

In particular, the control unit 22 may include measurement control software 24 that receives input from a timer 26. The measurement control software 24 may also interface with position estimator software 28, and a force/torque sensor interface 30, (which may be on a separate interface card connected to the control unit 22). The measurement control software also interfaces with a digital input/output (I/O) 32, which may have an enable signal output 34 and a directional signal output 36. A counter algorithm 38 may receive input from the measurement control software 24. The digital I/O 32 and counter 38 may be on separate interface cards connected to the control unit 22, if so desired. The software 24 may include the graphical user interface, as discussed above, a storage routing to record, organize and store torque/angular displacement (or force/displacement) profiles, an editor to edit the motion paths, and an output routine to provide output data that accurately describes the torque/angular displacement profiles of a switch.

Electronically connected to the output from the control unit 22 is a motor driver 40, including a stepper motor controller 42. The stepper motor controller 42 has inputs for receiving output from the counter 38 as well as the enable signal output 34 and direction signal output 36 from the digital I/O 32. The computing system, software and motor controller discussed so far assumes that a rotary stepper motor 44 is employed. If one desires to employ a different type of motor, then the computing system, software and motor controller would, of course, be modified to interface with that type of motor. Although, a stepper motor is generally preferable since it can be easily controlled open loop.

The stepper motor controller 42 electronically interfaces with the motor 44, which is mounted to an adjustable fixture 46. The fixture 46 can be any type that will allow one to adjust it so as to locate and orient the motor 44 as needed for a particular switch being measured, and then secure the motor 44 in place. A motor shaft 48 extends from the motor 44 and engages a measurement unit, indicated generally at 50. The measurement unit 50 may include a gear reductor 52, that may be connected to and rotationally driven by the motor shaft 48. The gear redactor 52 may then connect to and drive a force/torque sensor 56.

The force/torque sensor 56 is, in turn, connected to an end effector, indicated generally at 58. The end effector 58 is the part of the measurement unit 50 that engages the particular pivot switch 60 (shown in phantom in FIG. 1) being measured and will vary depending upon the type of pivoting motion being measured for a particular type of pivot switch. Examples of pivot switches 60 that may be measured are multi-function stalk pivot, push-pull, and rocker switches. When referring to pivot type switches herein (as opposed to rotary type switches), these are switches that typically only pivot about 10–15 degrees in each direction, with a maximum of about 30 degrees in each direction. For these pivot switches in particular, it is generally difficult to determine the location of the axis of pivot. This is why, in prior switch feel measurement methods for pivot switches, linear motion measurement units were used.

The switch measuring system 20 may also include a switch mounting support 62 for securing the switch 60 while it is being measured. The switch mounting support 62 preferably allows the position of the switch 60 to be adjusted until it is at a desired location relative to the measuring unit 50, and then secures it in place so that the switch housing does not move during testing. The switch mounting support 62 secures the switch housing while minimally affecting the movement characteristics of the switch 60 in order to assure that the measured switch characteristics are accurate.

The switch mounting support may be mounted on a motion table 70, if it is desired to more fully automate the alignment of the switch axis 64 and measurement axis 66. The motion table 70 includes a motion table actuator 72 that can precisely move the switch mounting support. Moreover, a digital camera setup 68 that is capable of detecting changes in position and detecting the amount of movement of an object may also be employed, if so desired. The motion table actuator 72 and digital camera setup 68 can be controlled by the control unit 22 if one wishes to fully automate the alignment process.

The measurement unit 50 (including the end effector 58) and switch 60 are illustrated generally in FIG. 1 in order to show an example of an overall setup to which the methods of the present invention can be applied, as discussed below. Thus, the methods discussed may be used with other configurations of a switch feel measuring system, if so desired.

The control unit 22 determines in which direction, how fast and how far the motor 44 will drive the measurement unit 50. The measurement unit 50 moves the pivot switch 60 over its path of travel while measuring and transmitting the torque measurements to the control unit 22. The motor 44 can cause the pivot switch 60 to move with various velocity profiles over its path, providing a number of torque/angular displacement curves that can be used to define the pivot switch 60.

The pivot switch 60 has a switch axis 64 about which it pivots, and the measurement unit 50 has a measurement axis 66 about which it rotates. Ideally, for accurate measurements, the switch axis 64 measurement axis 66 are exactly the same axis. While exact alignment is not practicable, the methods of alignment described herein allow the axes to be aligned sufficiently to minimize the potential errors between the measured torque/angular displacement curves and the actual torque/angular displacement for the pivot switch being measured.

FIG. 2 is a flow chart illustrating a process for aligning the measurement axis 66 with the switch pivot axis 64. This process will be discussed as it can be applied to the system of FIG. 1. The measurement unit 50 is assembled and mounted to the shaft 48 of the motor 44, step 100. The particular pivot switch 60 to be measured is mounted in the switch mounting support 62, step 102. The mounting support 62 and measurement unit 50 will generally be set up so that the axes 64, 66 are parallel. If not, then the measurement unit 50 and/or the switch 60 are adjusted to assure that the axes are parallel to each other, step 104. At this point in the setup process it is likely that the measurement axis 66 is not aligned with the switch axis 64. The geometry of this misalignment and the affect it has on the accuracy of the torque/angular displacement profile will be discussed relevant to FIG. 7.

Figure 7:
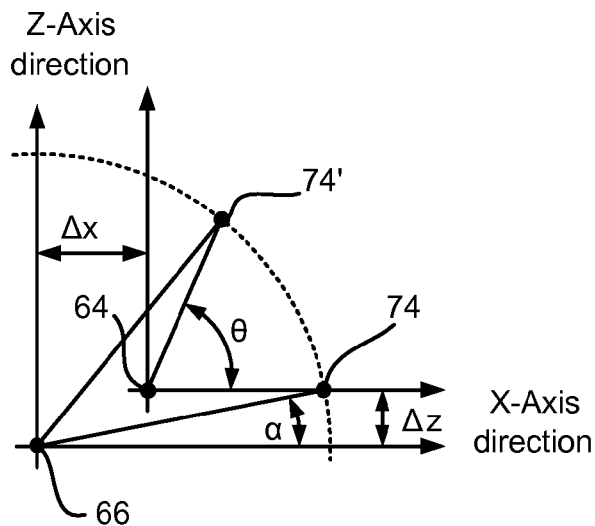
FIG. 7 is a graphical illustration of the geometry for a measurement unit having a rotational axis that is misaligned with a pivot axis of a switch being tested.

FIG. 7 is a graph illustrating the geometry for misalignment of the axis of rotation 66 of the measurement unit 50 relative to the axis of pivot 64 of the switch 60 (for the system shown in FIG. 1). For convenience and clarity in describing the method as it relates to a pivot switch, an X-axis direction and a Z-axis direction will be used. The X-axis direction is a direction aligned with and parallel to the initial direction of motion of a pivot switch as it is initially moved from its resting position—also referred to herein as a switch parallel axis. The Z-axis direction is a direction normal to the X-axis direction that is also normal to the switch face when the pivot switch is in its resting position—also referred to herein as a switch normal axis. Thus, the axes are relative to a switch being measured, not absolute directions.

When the axis of rotation 66 of the measurement unit 50 is, for example, below and to the left of the axis of pivot 64 of the switch 60—that is, a Δx and Δz offset—the torque $\tau_m$ measured by the measurement unit 50 will not properly reflect the actual resistance torque $\tau_s$ of the switch 60. The difference between the measured torque $\tau_m$ and the switch torque $\tau_s$ can be mathematically described by the following equation:

$$\tau_m = l_m \times \frac{\tau_s(\theta)}{l_s} \times \cos(\theta - \alpha),$$

where $l_m$ is a distance from the axis of rotation 66 of the measurement unit 50 to a contact point 74 of the end effector 58 on the pivot switch, $l_s$ is a distance from the axis of pivot 64 of the switch 60 to the contact point 74, $\theta$ is an angle the contact point 74 on the switch rotates through as the contact point moves to location 74', and $\alpha$ is an initial angle between the X-Axis direction and the line extending from the measurement axis 66 to the contact point 74. One can see from this equation, then, that the measured torque $\tau_m$ and the switch torque $\tau_s$ are different and this difference will vary throughout the switch travel. Such misalignment will cause errors in measured switch feel characteristics if not corrected.

Returning to the discussing of FIG. 2, the measurement unit 50 is aligned along the normal axis, step 106, and is then aligned along the parallel axis, step 108 (discussed in more detail below). The switch and measurement axes alignment is complete, step 110, and the pivot switch is ready to be measured for switch feel characteristics.

FIGS. 3 and 4 are alternative examples of steps that can be taken to accomplish the normal axis alignment of step 106 in FIG. 2. If one begins with the offset of axes shown in FIG. 7, and the initial contact point 74 being close to the X-axis direction, one may analytically map the displacement of the contact point on the surface of the pivot switch 60 as a function of the alignment offsets (i.e., Δx and Δz). It is interesting to note that the Δz offset accounts for most of the displacement of the contact point, while the Δx offset has almost no contributing effect to it. From this analytical map, then, one may see that, to eliminate the Δz offset, it is sufficient to actuate the pivot switch 60 with the measurement unit 50 and adjust their relative Δz positions until no displacement of the contact point is observed on the switch surface.

In FIG. 3, this is accomplished by mounting the end effector 58 of the measurement unit 50 on the pivot switch 60, step 114. The measurement unit 50 and/or the switch mounting support 62 are adjusted in the Z-axis direction until, from a visual inspection, the measurement axis 66 and the switch axis 64 appear to be aligned in the Z-axis direction, step 116. The pivot switch 60 is then actuated by the measurement unit 50, step 118, while measuring the distance the end effector 58 slides on the pivot switch 60, step 120. The measurement of the amount of slide can be accomplished with the digital camera setup 68, or some other automated means to measure the movement of the end effector 58 along the surface of the pivot switch 60. The position of the switch axis relative to the measurement axis is adjusted in the normal axis direction based on the measured amount of slide, step 122. An automated adjustment can be accomplished by employing the motion table 70 and table actuator 72. The amount that the actuator 72 moves the table 70 in the Z-axis direction is based on the starting contact point, the ending contact point, and the angle of pivot, with a look-up table employed to determine amount of Δz offset.

FIG. 4 illustrates an alternative way to accomplish step 106 in FIG. 2 that is somewhat less automated than the method of FIG. 3. To accomplish this, the end effector 58 of the measurement unit 50 is mounted on the pivot switch 60, step 130. The measurement unit 50 and/or the pivot switch 60 are adjusted in the Z-axis direction (i.e., the switch normal axis direction) until, from a visual inspection, the measurement axis 66 and switch axis 64 appear to be aligned in the Z-axis direction, step 132. The pivot switch 60 is then actuated by the measurement unit 50, step 134, while determining if the contact point of the end effector 58 on the surface of the switch 60 changes, step 136. If the end effector 58 contact point slides on the pivot switch 60, then the Z-axis direction alignment is repeated, if not then the Z-axis direction alignment is complete, step 138.

Figure 5:
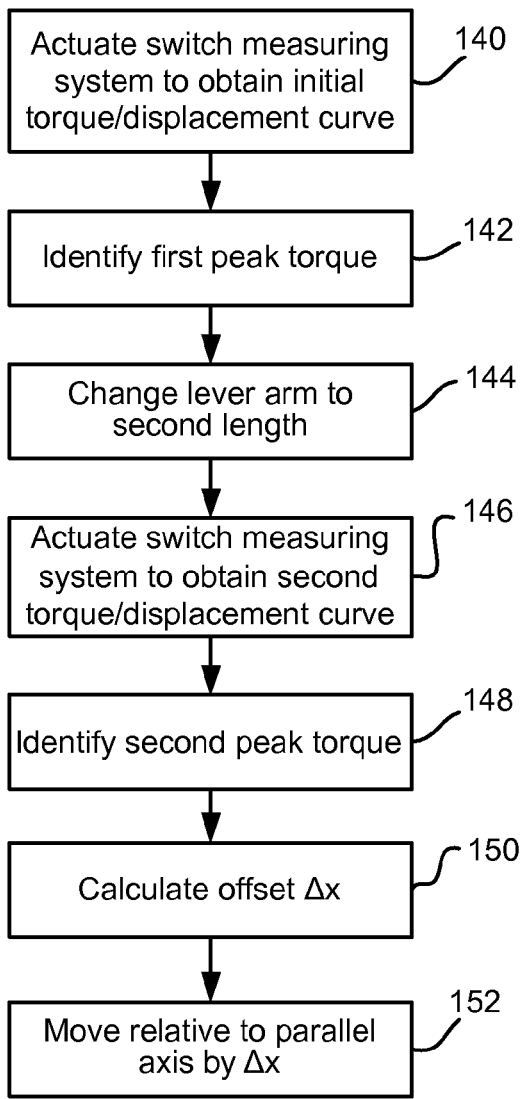
FIG. 5 is a flow chart illustrating details of a step for aligning axes in a direction of a switch parallel axis.

Once the Δz offset is reduced to an acceptable level, using the method of FIG. 3 or FIG. 4, the Δx offset is addressed. FIG. 5, in conjunction with FIGS. 8a and 8b, illustrates an example of steps that can be taken to accomplish the switch parallel axis alignment step 108 in FIG. 2.

Figure 8A:
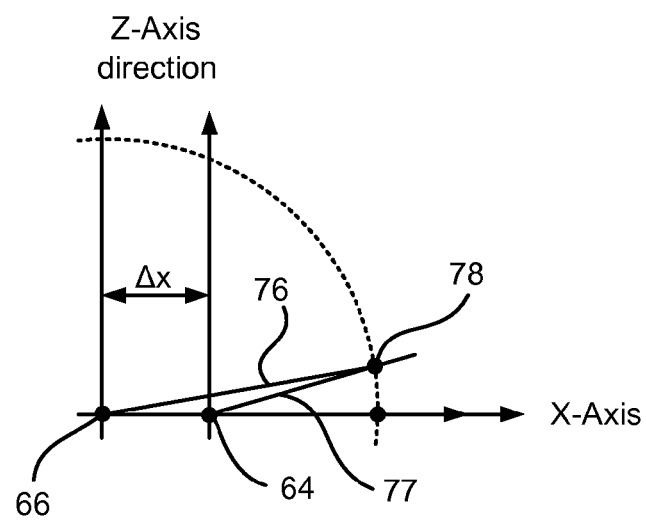

FIG. 8a illustrates the geometry of the pivot switch 60 and measurement unit 50 for the first two steps of the process in FIG. 5. The measurement axis 66 is offset from switch axis 64 by an unknown amount Δx. The end effector 58 has a radial arm (graphically illustrated as 76) with a length $l_{M1}$ from the measurement axis 66 to a contact point 78, and a resulting switch leverage arm 77 having a length $l_{S1}$, from the switch axis 64 to the contact point 78.

Referring now to FIG. 5, the switch measuring system 20 is actuated and obtains an initial torque/displacement curve, step 140. The first peak torque $\tau_{M1}$ is identified from this curve, step 142.

Figure 8B:
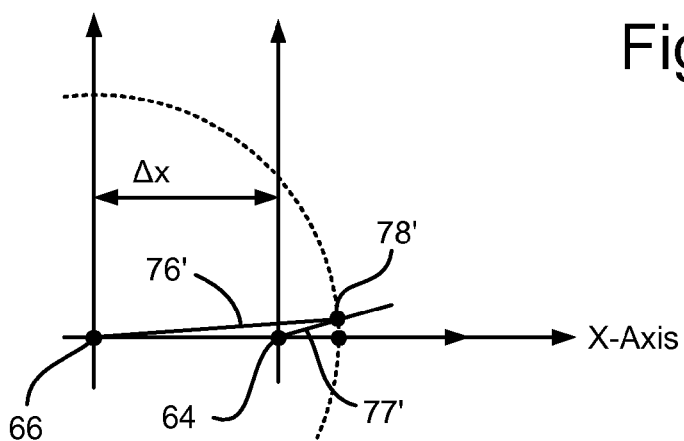

FIG. 8b illustrates the geometry of the pivot switch 60 and measurement unit 50 for the next three steps of the process in FIG. 5. With the measurement axis 66 still offset from the switch axis 64 by the unknown amount Δx, the radial arm 76' of the end effector 58 is changed to a length $l_{M2}$. This will cause the end effector 58 to have a new contact point 78', with a resulting switch leverage arm 77' having a length $l_{S2}$. One will note when comparing FIGS. 8a and 8b how the same rotational displacement of the pivot switch 60 is achieved with a much reduced rotation of the measurement radial arm, and how the leverage arms $l_{S1}$ and $l_{S2}$ change when changing the length of the measurement radial arm 76, 76'.

Referring again to FIG. 5, the lever arm is changed to a second length, step 144. The switch measuring system 20 is actuated and obtains a second torque/displacement curve, step 146. A second peak torque $\tau_{M2}$ is identified from the second curve, step 148. The amount of Δx offset is then calculated, in step 150, by solving the following equation:

$$\Delta x = \frac{l_{M1} l_{M2} (\tau_{M1} - \tau_{M2})}{\tau_{M1} l_{M2} - \tau_{M2} l_{M1}}$$

Accordingly, it is sufficient to take two separate measurements of the pivot switch 60, with two different measurement unit arm lengths, identify the peak torque for each measurement, and then solve the equation to obtain the Δx offset. Once the Δx offset is known, the pivot switch 60 and measurement unit 50 are moved in the opposite direction relative to each other by Δx in order to achieve alignment of the measurement axis 66 with the switch axis 64, step 152. This can be automated by using the control unit 22 to actuate the table actuator 72, moving the motion table 70 by the calculated amount of offset.

Figure 6:
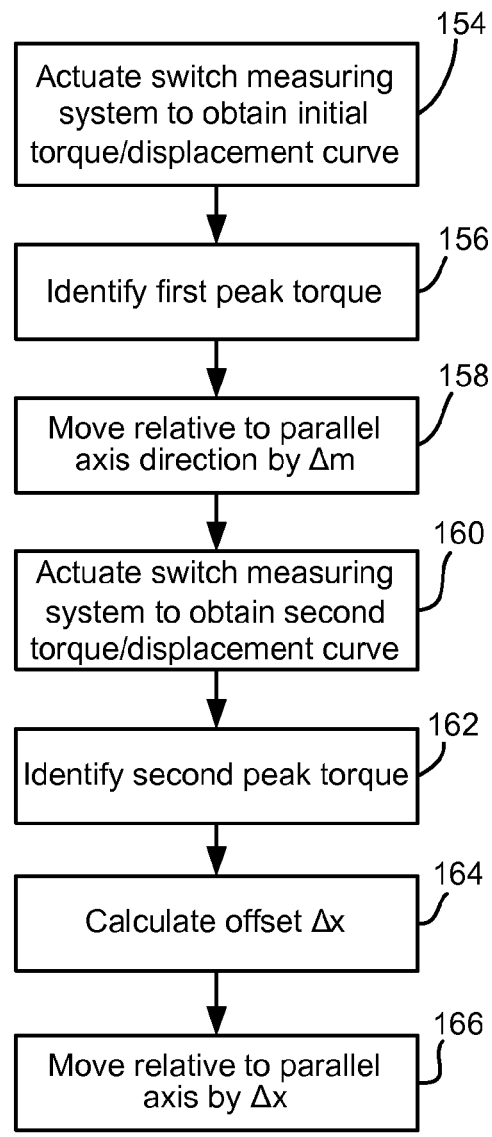
FIG. 6 is a flow chart similar to FIG. 5, but in accordance with another embodiment.
Figure 9A:
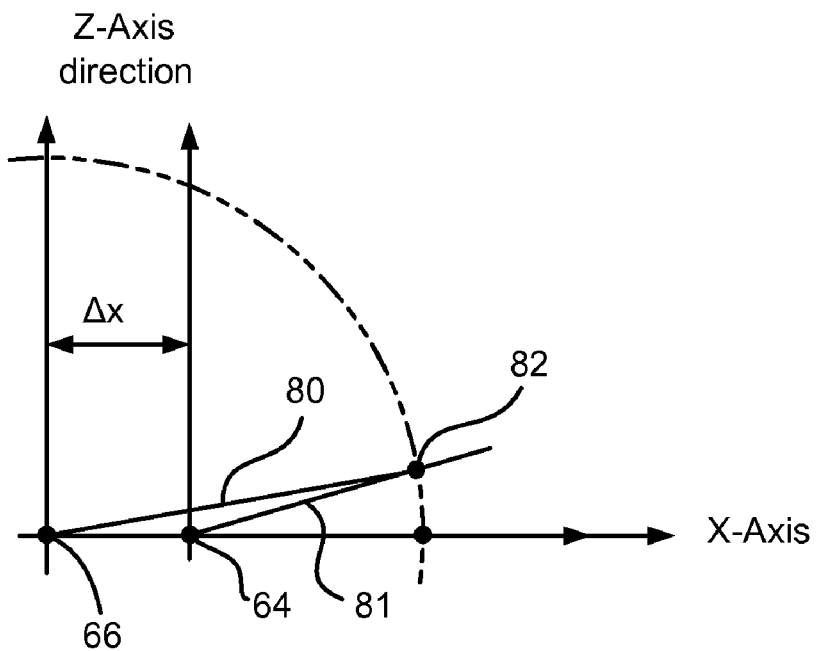
FIGS. 9a and 9b are graphical illustrations of the geometry for a method of aligning the measurement unit and switch axes along the switch parallel axis, according to the flow chart of FIG. 6.
Figure 9B:
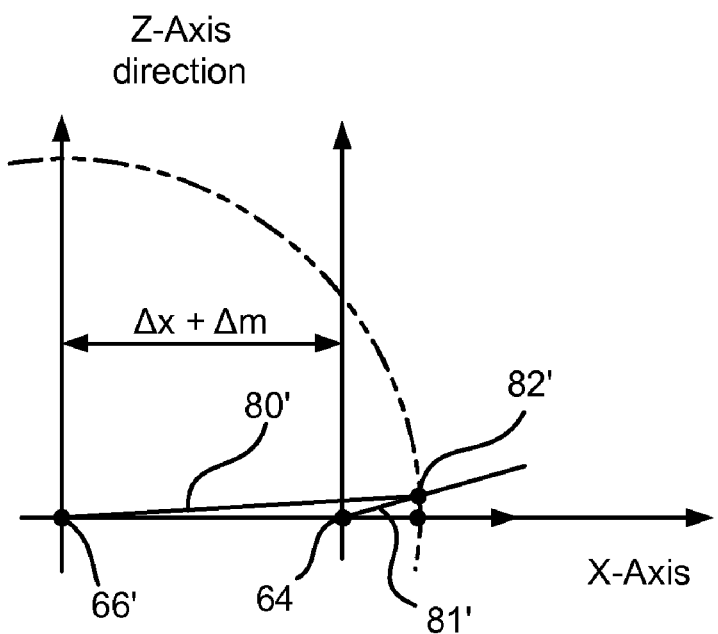

FIG. 6, in conjunction with FIGS. 9a and 9b, illustrates an example of alternative steps that can be taken to accomplish the alignment step 108 in FIG. 2. This method is similar to that of FIG. 5, but employs a different way of determining the Δx offset.

FIG. 9a illustrates the geometry of the pivot switch 60 and measurement unit 50 for the first two steps of the process in FIG. 6. The measurement axis 66 is offset in the X-axis direction (i.e., switch parallel axis direction) from the switch axis 64 by an unknown amount Δx. The end effector 58 has a radial arm (graphically illustrated as 80) with a length $l_M$ from the measurement axis 66 to a contact point 82, and a resulting switch leverage arm 81 having a length $l_{S1}$ from the switch axis 64 to the contact point 82.

Referring now to FIG. 6, the switch measuring system 20 is actuated and obtains an initial torque/displacement curve, step 154. The first peak torque $\tau_{M1}$ is identified from this curve, step 156.

FIG. 9b illustrates the geometry of the switch 60 and measurement unit 50 for the next three steps of the process in FIG. 6. The measurement axis 66' is offset in the X-axis direction from the switch axis 64 by an unknown amount Δx+Δm by moving the measurement unit 50 in the parallel axis direction by the amount Δm. The radial arm 80' of the end effector 58 is still the length $l_M$ extending from measurement axis 66' to contact point 82', while the switch leverage arm 81' now has a length $l_{S2}$. One will note when comparing FIGS. 9a and 9b how the same rotational displacement of the switch 60 is achieved with a much reduced rotation of the measurement radial arm, and how the leverage arms $l_{S1}$ and $l_{S2}$ change when changing the X-axis position of the measurement unit 50.

Referring again to FIG. 6, the measurement unit 50 is moved in the X-axis direction a distance Δm, step 158. This movement can be automated by employing the table actuator 72 and motion table 70, if so desired. The switch measuring system 20 is actuated and obtains a second torque/displacement curve, step 160. A second peak torque $\tau_{M2}$ is identified from the second curve, step 162. The amount of Δx offset is then calculated, in step 164, by solving the following equation:

$$\Delta x = \frac{l_M (\tau_{M1} - \tau_{M2}) + \Delta m \tau_{M2}}{\tau_{M1} - \tau_{M2}}$$

Accordingly, it is sufficient to take two separate measurements of the switch 60, with the measurement unit 50 located at two different X-axis positions relative to the pivot switch 60, identify the maximum torque for each measurement, and then solve the equation to obtain the Δx offset. Once the Δx offset is known, the pivot switch 60 and measurement unit 50 are moved in the opposite direction relative to each other by Δx in order to achieve alignment of the measurement axis 66 with the switch axis 64, step 166.

The specific examples of a switch measuring system—and methods of aligning, calibrating and monitoring feedback therefrom—discussed herein have been directed to switches, but this system is, of course, applicable to measuring and creating torque/displacement profiles for other types of small one degree of freedom mechanisms that pivot. Consequently, where the term pivot switch is used herein, this also includes other types of small one degree of freedom pivoting mechanisms.

While certain embodiments of the present invention have been described in detail, those familiar with the art to which this invention relates will recognize various alternative designs and embodiments for practicing the invention as defined by the following claims.

What is claimed is:

1. A method for minimizing errors associated with measuring torque/angular displacement profiles of a pivot switch, the method comprising the steps of:
   (a) mounting the pivot switch with a switch axis parallel to a measurement axis for a measurement unit of a switch measuring system;
   (b) detecting a switch normal axis direction offset between the switch axis and the measurement axis;

(c) aligning the switch axis with the measurement axis in the switch normal axis direction, if the switch axis is offset from the measurement axis in the switch normal axis direction;

(d) detecting a switch parallel axis direction offset between the switch axis and the measurement axis, after step (c); and (e) aligning the switch axis with the measurement axis in the switch parallel axis direction, if the switch axis is offset from the measurement axis in the switch axis parallel direction.

2. The method of claim 1 wherein step (b) is further defined by visually aligning the switch axis and the measurement axis in the switch normal axis direction; and moving the pivot switch through a range of motion with the measurement unit while determining if an end effector in contact with the pivot switch slides relative to a contact point on the pivot switch; and step (c) is further defined by changing the alignment of the switch axis relative to the measurement axis in the switch normal axis direction if the end effector slides relative to the contact point while moving through the range of motion.

3. The method of claim 2 wherein step (d) is further defined by moving the pivot switch through a second range of motion with the measurement unit while measuring a first torque on the pivot switch; determining a first peak torque $\tau_{M1}$ from the measured first torque; changing a length of a lever arm of the end effector that is in engagement with the pivot switch; moving the pivot switch through the second range of motion with the measurement unit while measuring a second torque on the pivot switch; determining a second peak torque $\tau_{M2}$ from the measured second torque; and calculating a $\Delta x$ offset in the switch parallel axis direction by solving an equation $$\Delta x = \frac{l_{M1} l_{M2} (\tau_{M1} - \tau_{M2})}{\tau_{M1} l_{M2} - \tau_{M2} l_{M1}},$$

where $l_{M1}$ is the length of the lever arm, from the measurement axis to the contact point, prior to the step of changing the length, and $l_{M2}$ is the length of the lever arm of the end effector after the step of changing the length; and step (e) is further defined by moving the pivot switch relative to the measurement unit by the offset $\Delta x$ in an opposite direction to the switch parallel axis direction.

4. The method of claim 2 wherein step (d) is further defined by: moving the pivot switch through a second range of motion with the measurement unit while measuring a first torque on the pivot switch; determining a first peak torque $\tau_{M1}$ from the measured first torque; moving the pivot switch relative to the measurement unit by a distance $\Delta m$ in the switch parallel axis direction; moving the pivot switch through the second range of motion with the measurement unit while measuring a second torque on the pivot switch; determining a second peak torque $\tau_{M2}$ from the measured second torque; and calculating a $\Delta x$ offset in the switch parallel axis direction by solving an equation $$\Delta x = \frac{l_M (\tau_{M1} - \tau_{M2}) + \Delta m \tau_{M2}}{\tau_{M1} - \tau_{M2}},$$

where $l_M$ is a length, from the measurement axis to the contact point, of a lever arm of the end effector; and step (e) is further defined by moving the pivot switch relative to the measurement unit by the offset $\Delta x$ in an opposite direction to the switch parallel axis direction.

5. The method of claim 1 wherein step (b) is further defined by visually aligning the switch axis and the measurement axis in the switch normal axis direction; and moving the pivot switch through a range of motion with the measurement unit while measuring a distance that an end effector in contact with the pivot switch slides relative to a contact point on the pivot switch; and step (c) is further defined by changing the alignment of the switch axis relative to the measurement axis in the switch normal axis direction based on the measured distance that the end effector slides relative to the contact point while moving through the range of motion.

6. The method of claim 5 wherein step (d) is further defined by moving the pivot switch through a second range of motion with the measurement unit while measuring a first torque on the pivot switch; determining a first peak torque $\tau_{M1}$ from the measured first torque; changing a length of a lever arm of the end effector that is in engagement with the pivot switch; moving the pivot switch through the second range of motion with the measurement unit while measuring a second torque on the pivot switch; determining a second peak torque $\tau_{M2}$ from the measured second torque; and calculating a $\Delta x$ offset in the switch parallel axis direction by solving the equation $$\Delta x = \frac{l_{M1} l_{M2} (\tau_{M1} - \tau_{M2})}{\tau_{M1} l_{M2} - \tau_{M2} l_{M1}},$$

where $l_{M1}$ is the length of the lever arm, from the measurement axis to the contact point, prior to the step of changing the length, and $l_{M2}$ is the length of the lever arm of the end effector after the step of changing the length; and step (e) is further defined by moving the pivot switch relative to the measurement unit by the offset $\Delta x$ in an opposite direction to the switch parallel axis direction.

7. The method of claim 5 wherein step (d) is further defined by: moving the pivot switch through a second range of motion with the measurement unit while measuring a first torque on the pivot switch; determining a first peak torque $\tau_{M1}$ from the measured first torque; moving the pivot switch relative to the measurement unit by a distance $\Delta m$ in the switch parallel axis direction; moving the switch through the second range of motion with the measurement unit while measuring a second torque on the pivot switch; determining a second peak torque $\tau_{M2}$ from the measured second torque; and calculating a $\Delta x$ offset in the switch parallel axis direction by solving an equation $$\Delta x = \frac{l_M (\tau_{M1} - \tau_{M2}) + \Delta m \tau_{M2}}{\tau_{M1} - \tau_{M2}},$$

where $l_M$ is a length, from the measurement axis to the contact point, of a lever arm of the end effector; and step (e) is further defined by moving the pivot switch relative to the measurement unit by the offset $\Delta x$ in an opposite direction to the switch parallel axis direction.

8. The method of claim 1 wherein step (d) is further defined by moving the pivot switch through a range of motion with the measurement unit while measuring a first torque on the pivot switch; determining a first peak torque $\tau_{M1}$ from the measured first torque; changing a length of a lever arm of an end effector that is in engagement with the pivot switch; moving the pivot switch through the range of motion with the measurement unit while measuring a second torque on the pivot switch; determining a second peak torque $\tau_{M2}$ from the measured second torque; and calculating a $\Delta x$ offset in the switch parallel axis direction by solving an equation $$\Delta x = \frac{l_{M1} l_{M2} (\tau_{M1} - \tau_{M2})}{\tau_{M1} l_{M2} - \tau_{M2} l_{M1}},$$

where $l_{M1}$ is the length of the lever arm, from the measurement axis to a contact point on the pivot switch, prior to the step of changing the length, and $l_{M2}$ is the length of the lever arm of the end effector after the step of changing the length; and step (e) is further defined by moving the pivot switch relative to the measurement unit by the offset $\Delta x$ in an opposite direction to the switch parallel axis direction.

9. The method of claim 1 wherein step (d) is further defined by: moving the pivot switch through a range of motion with the measurement unit while measuring a first torque on the pivot switch; determining a first peak torque $\tau_{M1}$ from the measured first torque; moving the pivot switch relative to the measurement unit by a distance $\Delta m$ in the switch parallel axis direction; moving the pivot switch through the range of motion with the measurement unit while measuring a second torque on the pivot switch; determining a second peak torque $\tau_{M2}$ from the measured second torque; and calculating a $\Delta x$ offset in the switch parallel axis direction by solving an equation $$\Delta x = \frac{l_M (\tau_{M1} - \tau_{M2}) + \Delta m \tau_{M2}}{\tau_{M1} - \tau_{M2}},$$

where $l_M$ is a length, from the measurement axis to a contact point on the pivot switch, of a lever arm of an end effector; and step (e) is further defined by moving the pivot switch relative to the measurement unit by the offset $\Delta x$ in an opposite direction to the switch parallel axis direction.

10. A method for aligning a switch axis of a pivot switch to be measured with a measurement axis of a measuring unit of a switch feel measuring system, the method comprising the steps of:

(a) mounting the pivot switch with the switch axis parallel to the measurement axis;

(b) visually aligning the switch axis and the measurement axis in a switch normal axis direction;

(c) moving the pivot switch through a range of motion with the measurement unit while determining if an end effector in contact with the pivot switch slides relative to a contact point on the pivot switch; and (d) changing the alignment of the switch axis relative to the measurement axis in the switch normal axis direction if the end effector slides relative to the contact point while moving through the range of motion.

11. The method of claim 10 including the steps of:

(e) moving the pivot switch through a second range of motion with the measurement unit while measuring a first torque on the pivot switch;

(f) determining a first peak torque $\tau_{M1}$ from the measured first torque;

(g) changing a length of a lever arm of the end effector that is in engagement with the pivot switch;

(h) moving the pivot switch through the second range of motion with the measurement unit while measuring a second torque on the pivot switch;

(i) determining a second peak torque $\tau_{M2}$ from the measured second torque;

(j) calculating a $\Delta x$ offset in the switch parallel axis direction by solving an equation $$\Delta x = \frac{l_{M1} l_{M2} (\tau_{M1} - \tau_{M2})}{\tau_{M1} l_{M2} - \tau_{M2} l_{M1}},$$

where $l_{M1}$ is the length of the lever arm, from the measurement axis to the contact point, prior to step (g), and $l_{M2}$ is the length of the lever arm of the end effector after step (g); and (k) moving the pivot switch relative to the measurement unit by the offset $\Delta x$ in an opposite direction to the switch parallel axis direction.

12. The method of claim 10 including the steps of:

(e) moving the pivot switch through a second range of motion with the measurement unit while measuring a first torque on the pivot switch;

(f) determining a first peak torque $\tau_{M1}$ from the measured first torque;

(g) moving the pivot switch relative to the measurement unit by a distance $\Delta m$ in the switch parallel axis direction;

(h) moving the pivot switch through the second range of motion with the measurement unit while measuring a second torque on the pivot switch;

(i) determining a second peak torque $\tau_{M2}$ from the measured second torque;

(j) calculating a $\Delta x$ offset in the switch parallel axis direction by solving an equation $$\Delta x = \frac{l_M (\tau_{M1} - \tau_{M2}) + \Delta m \tau_{M2}}{\tau_{M1} - \tau_{M2}},$$

where $l_M$ is a length, from the measurement axis to the contact point, of a lever arm of the end effector; and (k) moving the pivot switch relative to the measurement unit by the offset $\Delta x$ in an opposite direction to the switch parallel axis direction.

13. The method of claim 10 wherein step (c) is further defined by moving the pivot switch through the range of motion with the measurement unit while measuring a distance that the end effector in contact with the pivot switch slides relative to the contact point; and step (d) is further defined by changing the alignment of the switch axis relative to the measurement axis in the switch normal axis direction based on the measured distance that the end effector slides relative to the contact point while moving through the range of motion.

14. A method for aligning a switch axis of a pivot switch to be measured with a measurement axis of a measuring unit of a switch feel measuring system, the method comprising the steps of:

(a) mounting the pivot switch with the switch axis parallel to the measurement axis;

(b) aligning the switch axis and the measurement axis in a switch normal axis direction;

(c) moving the pivot switch through a range of motion with the measurement unit and determining a first peak torque $\tau_{M1}$;

(d) changing a contact point of an end effector of the measurement unit on the pivot switch;

(e) moving the pivot switch through the range of motion with the measurement unit and determining a second peak torque $\tau_{M2}$, after step (d);

(f) calculating an offset in a switch parallel axis direction based on the first peak torque $\tau_{M1}$ and the second peak torque $\tau_{M2}$; and (g) aligning the switch axis with the measurement axis in the switch parallel axis direction, if the switch axis is offset from the measurement axis in the switch axis parallel direction.

15. The method of claim 14 wherein step (d) is further defined by changing a length of a lever arm of the end effector that is in engagement with the pivot switch; and step (f) is further defined by calculating a $\Delta x$ offset in the switch parallel axis direction by solving an equation $$\Delta x = \frac{l_{M1}l_{M2}(\tau_{M1} - \tau_{M2})}{\tau_{M1}l_{M2} - \tau_{M2}l_{M1}},$$

where $l_{M1}$ is the length of the lever arm, from the measurement axis to the contact point, prior to step (d), and $l_{M2}$ is the length of the lever arm of the end effector after step (d).

16. The method of claim 14 step (d) is further defined by moving the pivot switch relative to the measurement unit by a distance $\Delta m$ in the switch parallel axis direction; and step (f) is further defined by calculating a $\Delta x$ offset in the switch parallel axis direction by solving an equation $$\Delta x = \frac{l_M(\tau_{M1} - \tau_{M2}) + \Delta m \tau_{M2}}{\tau_{M1} - \tau_{M2}},$$

where $l_M$ is a length, from the measurement axis to the contact point, of a lever arm of the end effector.

17. The method of claim 14 wherein step (b) is further defined by visually aligning the switch axis and the measurement axis in the switch normal axis direction; and moving the pivot switch through a second range of motion with the measurement unit while determining if the end effector in contact with the pivot switch slides relative to the contact point on the pivot switch; and changing the alignment of the switch axis relative to the measurement axis in the switch normal axis direction if the end effector slides relative to the contact point while moving through the second range of motion.

18. The method of claim 14 wherein step (b) is further defined by visually aligning the switch axis and the measurement axis in the switch normal axis direction; and moving the pivot switch through a second range of motion with the measurement unit while measuring a distance that the end effector in contact with the pivot switch slides relative to the contact point on the pivot switch; and changing the alignment of the switch axis relative to the measurement axis in the switch normal axis direction based on the measured distance that the end effector slides relative to the contact point while moving through the second range of motion.

* * * * *